United States Patent Office 2,923,311
Patented Feb. 2, 1960

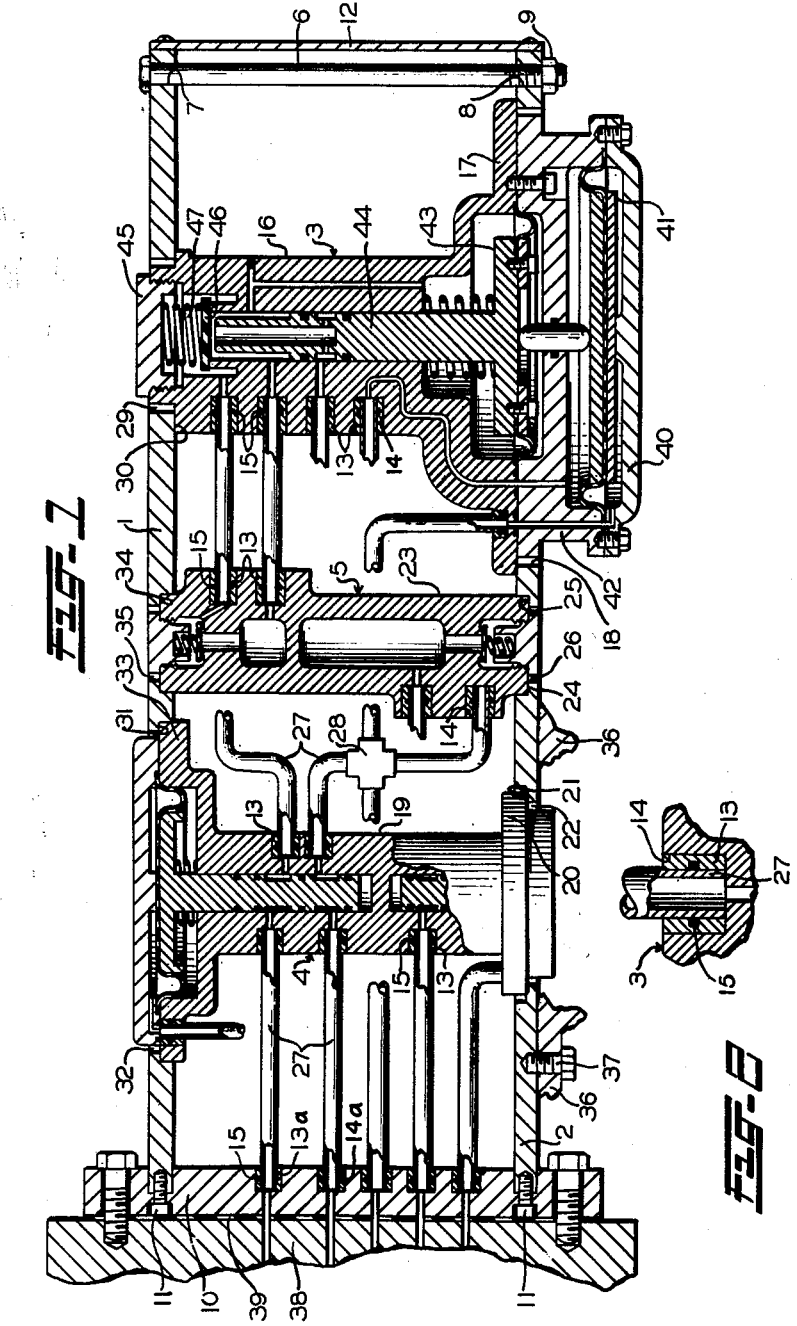

2,923,311

MULTIPLE VALVE UNIT AND METHOD OF CONSTRUCTION AND ASSEMBLY THEREOF

William B. Jeffrey, Irwin, Pa., assignor to Westinghouse Air Brake Company, Wilmerding, Pa., a corporation of Pennsylvania Application August 29, 1957, Serial No. 681,075

3 Claims. (Cl. 137—315)

This invention relates to multiple valve units, and more particularly to a novel method of construction and assembly of multiple valve units comprising a plurality of pneumatically controlled valves.

In the railway brake field, brake controlling valve units comprise a variety of valve devices contained in one or more complex sectionalized castings and having fluid pressure connections effected by cored passages and/or drilled ports. This method of construction and assembly is costly, for the following reasons:

A costly and complex casting may be defective in only one respect and have to be scrapped before machining, or, as will usually be the case, one or more defects in the complex casting will not be caused or detected until the casting has been machined, bushed and/or assembled for test, with the result that the casting will have to be scrapped after considerable expense has been incurred. Also, in order to prevent excessive scrap losses, castings are frequently modified, to incorporate new features or improvement of existing features, by using filler pieces, adapter brackets, or plugs which undesirably increase the volume in the fluid-conveying passages and/or unduly add to the weight of the device.

It has heretofore been proposed to employ a series of interchangeable valve devices having oppositely arranged, parallel, highly machined, mating faces to permit a certain degree of modification of multiple valve units to incorporate improvements and reduce scrap losses if any component valve device is defective or has to be modified. However, these interchangeable valve units are relatively costly because of the expense in accurately machining their mating faces, and because of the added metal necessary to provide valve bodies with flat, machinable faces instead of the conventional unmachined circular surfaces.

It is therefore the principal object of this invention to provide an improved, relatively lightweight, and inexpensive multiple valve unit composed of a plurality of valve devices arranged, either singly or in pairs, in relatively simple castings of substantially uniform height so as to permit these castings to be clamped adjacent their upper and lower surfaces between oppositely arranged perforated clamping plates, and wherein fluid pressure tight connections are quickly and easily established between the various component valve devices by conventional flexible stainless steel tubing which seals against O-ring seals carried within bushings press fit into receiving ports in said castings.

Another object is to provide an improved multiple valve unit so constructed and assembled that parts of the component valve devices may be individually removed, without removal of the other valve devices or the clamping plates, to facilitate replacement of components within the valve castings.

Another object is to provide an improved multiple valve unit wherein one or two component valve devices may be substituted for a modified valve device or devices that incorporate improvements, without the necessity of scrapping the other unmodified components.

Still another object is to provide an improved multiple valve unit composed of standardized valve devices which may be added or removed to provide or dispense with certain features which may or may not be desired, without requiring the use of a variety of filler pieces, adapter brackets or plugs.

Other objects and advantages will become apparent from the following more detailed description of the invention and from the accompanying drawing: wherein Fig. 1 is a diagrammatic view of a multiple valve unit embodying the invention, and Fig. 2 is an enlarged fragmentary view of the structure whereby the fluid pressure tight connections, shown to reduced scale in Fig. 1, are established.

As viewed in Fig. 1 of the drawing, the multiple valve device embodying the invention comprises two vertically spaced, horizontal, generally rectangular clamping plates 1 and 2 preferably of substantially the same area; a plurality of valve devices, such as 3, 4, 5 having respective sectionalized casings; a plurality of tie-bolts 6 (only one of which is shown), each passing through aligned holes 7, 8 through, and preferably near the four corners of the upper clamping plate 1 and lower clamping plate 2, and each having a nut 9 which is tightened to rigidly clamp the said valve devices between said clamping plates; an end plate 10 to which the clamping plates are secured, as by cap screws 11; and a preferably one-piece U-shaped sheet metal protective shroud 12 which is suitably secured, as by screws (not shown), to the front and rear sides and one transverse end of each of the clamping plates in surrounding relation thereto and has, adjacent the open end of the U, outwardly directed flanges (not shown) having openings to accommodate cap screws (not shown) whereby the shroud may also be connected to the end plate 10.

In assembly, the valve devices 3, 4 and 5 are first assembled; and as best shown in Fig. 2, bushings, such as 13, are press fit into side ports, such as 14, in the casings of said valve devices, each of said bushings having an O-ring seal 15 which is preferably preinserted into grooves provided in the bores of said bushings; or, if preferred, the respective ports 14 may be internally grooved to accommodate the O-ring seals 15 without the use of bushings. In order to avoid cluttering Fig. 1 with reference numerals, only some of the bushings 13, ports 14 and seals 15 are numbered.

The lower clamping plate 2 is then placed in a suitable jig, and the valve devices are placed in the lower clamping plate, such as in any of the following ways, shown for sake of illustration. For example, the sectionalized casing of valve device 3 may be provided with a main portion 16 having an outwardly directed annular flange 17 that overlies the upper surface of lower clamping plate 2 in encirclement of a vertical opening 18 therethrough; the sectionalized casing of valve device 4 may have a main portion 19 having an outwardly directed annular flange 20 that overlies and seats on an annular shoulder 21 formed by a stepped opening 22 which is of smaller diameter at its lower end; and the sectionalized casing of valve device 5 may have a main portion 23 having an annular lower end 24 which seats on an annular shoulder 25 formed by a stepped opening 26 of smaller diameter at its lower end. The valve devices 3, 4, 5 are then temporarily clamped in place, such as by C clamps or a suitable jig (not shown) which has arms that hold the respective valve devices 3, 4, 5 firmly against the lower clamping plate 2. The fluid pressure connections between the valve devices 3, 4, 5 are then established by a plurality of stainless steel flexible tubes 27, which are bent as necessary so that the ends of the various tubes can be inserted coaxially into the bushings 13 (or into the ports 14 if no bushings are used), as shown in the drawing, for so compressing the O-ring seals 15 between the bushings (or ports) and the outer periphery of said tubes as to provide fluid pressure tight connections between various chambers of the valve devices. In cases where a fluid connection is to be established between more than two chambers or passages, "crosses" 28 or T's (not shown) may be used which may be sealingly connected to the various tubes 27 either by sweating or by an O-ring type connection afforded by O-ring seals 15 carried in grooves provided in these "crosses" or T's.

After all of the fluid pressure connections have been effected between the valve devices, the tubes 27 which are to be inserted into bushings 13a (or ports 14a) of end plate 10 are preferably first inserted into the various bushings 13 (or ports 14) of the valve devices to be fluid pressure connected to the end plate, with the free ends of the tubes extending generally in the vicinity of the point at which the end plate is to be connected to the clamping plates 1 and 2. The temporary C clamps are then removed (or the jig arms raised) and the upper clamping plate 1 is lowered into contact with the valve devices, such contact being established in any of the following ways, shown for sake of illustration. For example, a part of the lower surface of clamping plate 1 encircling a through opening 29 may bear against an annular shoulder 30 formed near the upper end of main casing portion 16, the upper end of said portion projecting into said opening; an annular shoulder 31, which is formed in the plate 1 by a stepped opening 32 therethrough of larger diameter at its lower end, may abut an outwardly directed annular flange 33 provided at the upper end of main casing portion 19 of valve device 4; and an annular shoulder 34, which is formed in the plate 1 by a stepped opening 35 therethrough of larger diameter at its lower end, may abut the upper annular end of main casing portion 23 of valve device 5.

The clamping plates 1, 2 are then bolted together by bolts 6 and nuts 9; although, if preferred, one of the bolts 6 near the pipe bracket may be left out and later secured if it is desired to provide additional access to the tubes 27 to be connected to the end plate. The end plate 10 is then connected to the adjacent ends of the plates 1, 2 by the cap screws 11, with the tubes 27 being pressed into the bushings 13a (or ports 14a) extending inwardly from the inner face of said end plate for compressing the O-ring seals 15 carried within said bushings (or ports). Access to make these final connections between the tubes and end plate 10 is afforded through the then open front and rear sides (as viewed in the drawing) of the unit as thus far assembled. The protective shroud 12, which prevents damage to the tubes 27 by flying objects and entry of dirt and moisture, is then mounted on the unit in the manner heretofore described. To better seal the assembled unit against the entry of moisture, dust or rain, O-ring seals (not shown) may be inserted in grooves in the surfaces of the main portions 16, 19, 23 of the sectionalized valve casings that engage the upper and lower clamping plates 1, 2.

The assembled multiple valve unit is then preferably attached to a stationary load-supporting member 36, as by cap screws 37, and the end plate 10 is suitably mounted, as by cap screws, on a cored pipe bracket 38, to which the various pipes (not shown) leading to devices outside of the multiple valve unit and/or to any additional valve units, may be connected; a gasket 39 being interposed between the end plate and pipe bracket to prevent leakage of fluid under pressure therealong.

It is to be noted that the valve devices 3, 4, 5 are so clamped between the clamping plates 1, 2 that valve components may readily be removed and cleaned or replaced without removal of the shroud 12, bolts 6 and nuts 9, end plate 10, clamping plates 1 and 2, or tubes 27. For example, by removing a cover plate 40 of valve device 3, a movable abutment 41 may be removed; by removing cover plate 40 and a casing portion 42 that sealingly abuts the lower end face of main portion 16, a movable abutment 43 and a cylindrical slide valve 44 formed integrally therewith may be removed; and by removal of an externally threaded cap nut 45 from the part of main portion 16 that projects upwardly through the opening 29 in plate 1, a check valve 46 and its bias spring 47 may be removed. In similar manner, access may be readily obtained to the various components of valve devices 4 and 5.

Since the main portions 16, 19, 23 of the valve devices 3, 4, 5 must be of substantially uniform height in order to permit them to be effectively clamped between the plates 1 and 2, several small valve devices may actually be contained in, say, the sectionalized casing for valve device 4, thereby reducing the weight and overall size of the multiple valve unit and simplifying the latter by including, where practical, cored passages to interconnect certain chambers and thereby reduce the number of tubes required.

It is, of course, well known to connect a plurality of separate valve devices together by using sections of pipe, with or without pipe couplings, or by using fittings which require flaring of stainless steel tubing and space to accommodate a wrench for tightening the female part of said fittings into screw-threaded engagement with the male part. However, with applicant's improved arrangement, the multiple valve unit is desirably compact because the tubing is merely inserted into a bore for radially compressing an O-ring into sealing engagement with the tubing and no wrenches need be used and hence no wrench space provided.

Having now described the invention, what I claim as new and desire to secure by Letters Patent, is:

1. A multiple valve unit comprising a plurality of separate sectionalized valve casings which have main portions each of a substantially uniform height and other portions removably secured to and enclosing the upper and lower ends of said main portions, at least one valve device contained in each of said casings, a pair of spaced members respectively engaging vertically spaced surfaces provided on said main portions, securing means for clamping said members against said surfaces, said members having access openings into which said other portions of the respective casings project such that said other portions may be removed via the access openings for access to the interior of said casings to remove and reinstall components of the respective valve devices without the necessity of removing said securing means and unclamping said members, each of said main portions having intermediate its respective surfaces at least one port extending inwardly from the exterior of said main portion and having fluid communication with at least one chamber within the corresponding casing, resilient sealing rings carried within grooves formed in the walls of said ports, and a plurality of flexible tubes the end portions of which are pressed into the ports of different ones of said casings for radially compressing said resilient sealing rings so as to provide fluid pressure tight connections between said different casings, said flexible tubes being bent as necessary so that the portions of said tubes which extend into those respective ports which are disposed in said different casings and which may be at varying heights relative to one of said members will be substantially coaxially aligned with said ports.

2. A method of establishing fluid pressure tight connections between separate preassembled valve-device-containing sectionalized casings of a multiple valve unit assembly in which said sectionalized casings have main portions of substantially uniform height that contain cylindrical ports opening laterally through the exterior of said main portions for communication with chambers of the valve devices contained within said casings and also have other portions removably secured to said main portions for permitting valve device components to be installed and removed, said method comprising the steps of inserting O-ring seals into the various ports that are formed in the main portions; placing the preassembled sectionalized casings on a first generally horizontally extending member such that surfaces at or near the lower ends of the respective main portions overlie access openings extending through said member and into which certain of said other portions extend; pressing the respective one ends of a plurality of metallic flexible tubes substantially coaxially into different ports in certain of said main portions for radially compressing said O-ring seals into sealing engagement with said tubes, so as thereby to provide fluid pressure tight connections between said one ends of said tubes and said different ports; bending the flexible tubes intermediate their ends as necessary so that the respective other ends of said tubes will be disposed substantially coaxially with, but slightly outside of, other ports in other of said main portions which are to be interconnected by said tubes; simultaneously bending said tubes in a straightening direction to extend and press them into said other ports for radially compressing said O-ring seals to provide fluid pressure tight connections between said other ends and said other main portions; placing a second generally horizontally extending member over said preassembled sectionalized casings such that surfaces at or near the upper ends of the respective main portions are engaged by the lower surface of said second member surrounding access openings therethrough into which the remainder of said other portions extend; and securing said members together for clamping said valve casings firmly between said members.

3. The method as claimed in claim 2, further characterized in that when the said other ends of some of said tubes are to be connected to fluid pressure conveying conduits outside of the multiple valve unit, the following additional steps are taken after the said one ends of said some tubes are inserted in ports in said valve casings and said members are secured: inserting other O-ring seals in ports that are provided in a generally vertical end plate and have fluid pressure communication with respective ones of said conduits, and securing said end plate to said generally horizontal members and simultaneously pressing the said other ends of said some tubes into the corresponding ports in the end plate for radially compressing the said other O-ring seals disposed in the latter ports into sealing engagement with said some tubes, access to guide said some tubes during such pressing being afforded through the open front and rear sides of the multiple valve unit, whereby main portions of the respective valve casings will be interconnected with each other and with the end plate in a fluid pressure tight manner and whereby said other portions which are removably secured to said main portions may be removed without unclamping said members or removing said end plate.

References Cited in the file of this patent

UNITED STATES PATENTS

| | | |
|---|---|---|
| 931,512 | Speakman | Aug. 17, 1909 |
| 1,619,234 | Beebe | Mar. 1, 1927 |
| 1,814,678 | Ferguson | July 14, 1931 |
| 2,188,258 | Zinkil | Jan. 23, 1940 |
| 2,676,037 | Mueller | Apr. 20, 1954 |